US012010500B2

(12) United States Patent
Liu et al.

(10) Patent No.: US 12,010,500 B2
(45) Date of Patent: Jun. 11, 2024

(54) MAGNETIC POTENTIAL TRANSDUCER AND ELECTRONIC APPARATUS USING SAME

(71) Applicant: GOERTEK INC., Shandong (CN)

(72) Inventors: Chunfa Liu, Shandong (CN); Fenglei Zu, Shandong (CN); Xinfeng Yang, Shandong (CN)

(73) Assignee: GOERTEK INC., Weifang (CN)

( * ) Notice: Subject to any disclaimer, the term of this patent is extended or adjusted under 35 U.S.C. 154(b) by 224 days.

(21) Appl. No.: 17/625,660

(22) PCT Filed: Aug. 13, 2019

(86) PCT No.: PCT/CN2019/100298
§ 371 (c)(1),
(2) Date: Jan. 7, 2022

(87) PCT Pub. No.: WO2021/003795
PCT Pub. Date: Jan. 14, 2021

(65) Prior Publication Data

US 2022/0232327 A1 Jul. 21, 2022

(30) Foreign Application Priority Data

Jul. 8, 2019 (CN) ........................ 201910611182.9

(51) Int. Cl.
*H04R 9/18* (2006.01)
*H04R 7/18* (2006.01)
*H04R 9/02* (2006.01)

(52) U.S. Cl.
CPC ................. *H04R 9/18* (2013.01); *H04R 7/18* (2013.01); *H04R 9/025* (2013.01)

(58) Field of Classification Search
CPC . H04R 9/18; H04R 7/18; H04R 9/025; H04R 13/00; H04R 9/06; H04R 2400/11
See application file for complete search history.

(56) References Cited

U.S. PATENT DOCUMENTS 5,357,061 A * 10/1994 Crutchfield ............. G06F 3/046 178/18.08
6,853,735 B2 2/2005 Imahori et al.
(Continued)

FOREIGN PATENT DOCUMENTS

AU 2002356905 A1 5/2003
CN 101257735 A 9/2008
(Continued)

OTHER PUBLICATIONS

International Search Report from International Application No. PCT/CN2019/100298 dated Apr. 15, 2020.

*Primary Examiner* — Angelica M McKinney
(74) *Attorney, Agent, or Firm* — Shih IP Law Group, PLLC

(57) ABSTRACT

Disclosed is a magnetic potential transducer, comprising a fixed component and a movable component. The fixed component comprises: at least one static magnetic field generating device, the static magnetic field generating device forms a static magnetic field on the magnetic potential transducer; and at least one alternating magnetic field generating device, the alternating magnetic field generating device generates an alternating magnetic field on the magnetic potential transducer, and the alternating magnetic field is orthogonal or partially orthogonal to the static magnetic field. The movable component comprises at least one movable device and at least one suspension device, the movable device is provided with a magnetic conductive material, the magnetic conductive material moves in the magnetic potential transducer; at least a part of the magnetic conductive material is provided in an area where the alternating magnetic field and the static magnetic field overlap; a magnetic field force generated by the interaction.

10 Claims, 4 Drawing Sheets

(56) References Cited

U.S. PATENT DOCUMENTS

| | | | | |
|---|---|---|---|---|
| 6,856,735 | B2 | 2/2005 | Chang et al. | |
| 8,861,754 | B2 | 10/2014 | Zhou | |
| 9,668,058 | B2 * | 5/2017 | Matsumura | H04R 7/18 |
| 9,736,591 | B2 | 8/2017 | van Halteren et al. | |
| 10,117,025 | B2 * | 10/2018 | Epping | H04R 9/025 |
| 10,250,961 | B2 | 4/2019 | Zhang et al. | |
| 2002/0142795 | A1 | 10/2002 | Imahori et al. | |
| 2003/0068063 | A1 * | 4/2003 | Usuki | H04R 9/063 381/396 |
| 2003/0086651 | A1 | 5/2003 | Chang et al. | |
| 2008/0205691 | A1 | 8/2008 | Beekman et al. | |
| 2013/0170674 | A1 | 7/2013 | Zhou | |
| 2015/0245141 | A1 * | 8/2015 | van Halteren | H04R 1/00 381/398 |
| 2018/0152773 | A1 | 5/2018 | Zhang et al. | |

FOREIGN PATENT DOCUMENTS

| | | | | |
|---|---|---|---|---|
| CN | 102355617 | A | 2/2012 | |
| CN | 202334876 | U | 7/2012 | |
| CN | 102355617 | B | 4/2014 | |
| CN | 103747394 | A | 4/2014 | |
| CN | 104796828 | A | 7/2015 | |
| CN | 204482030 | U | 7/2015 | |
| CN | 105472514 | A | 4/2016 | |
| CN | 105812998 | A | 7/2016 | |
| CN | 103024646 | B | 8/2016 | |
| CN | 103747394 | B | 11/2017 | |
| CN | 107920291 | A | 4/2018 | |
| CN | 104796828 | B | 5/2018 | |
| CN | 108055629 | A | 5/2018 | |
| CN | 105812998 | B | 7/2018 | |
| CN | 105472514 | B | 4/2019 | |
| CN | 110012398 | A | 7/2019 | |
| CN | 209057343 | U | 7/2019 | |
| DK | 2914018 | T3 | 1/2017 | |
| EP | 1962550 | A2 | 8/2008 | |
| EP | 1962550 | A3 | 3/2009 | |
| EP | 2914018 | A1 | 9/2015 | |
| EP | 2914018 | B1 | 11/2016 | |
| IN | 103024646 | A | 4/2013 | |
| JP | 2002300698 | A | 10/2002 | |
| JP | 2008252872 | A | 10/2008 | |
| JP | 2017216541 | A | 12/2017 | |
| KR | 20150056227 | A * | 5/2015 | H04R 9/02 |
| WO | 03040779 | A2 | 5/2003 | |
| WO | 03040779 | A3 | 10/2003 | |
| WO | 2013023413 | A1 | 2/2013 | |
| WO | 2013040830 | A1 | 3/2013 | |
| WO | 2016176997 | A1 | 11/2016 | |
| WO | WO-2019080789 | A1 * | 5/2019 | H04R 1/1016 |

* cited by examiner

MAGNETIC POTENTIAL TRANSDUCER AND ELECTRONIC APPARATUS USING SAME

TECHNICAL FIELD

The present invention relates to a magnetic potential transducer and an electronic apparatus using the same.

BACKGROUND ART

Taking the micro transducer as an example, various small and portable consumer electronics such as mobile phones, tablet computers and laptops generally use various types of micro transducers as the main devices for outputting sound radiation and realizing certain displacement or vibration energy. Due to the design requirements of small volume and thin thickness, the micro transducer has a completely different design from the traditional large transducer:

1. the vibration stroke of the micro transducer is much smaller than that of the large transducer, but the vibration amplitude is close to the limit of its design size, so as to improve the low-frequency performance; 2. in order to adapt to the ultra-thin design, a flat and wide design or flat and long design is generally adopted, and the micro transducer must fully adapt to this feature and make use of this feature; 3. the micro transducer often cannot give full play to the performance of various components due to the above size limitations, and thus the conversion efficiency is low and the power consumption increases correspondingly; 4. the first-order resonant area is often the main working area of the micro transducer, but the first-order resonant frequency cannot be too low due to the size limitations, which seriously affects the low-frequency performance of the device.

Traditional micro transducers mainly comprise:

a. Moving iron transducer: the principle thereof is to use the central armature to drive the vibration system to generate sound or vibrate. The armature is a cantilever in which one end is fixed, and mainly has a U-shaped or T-shaped structure. This design is only applicable to the size of subminiature devices. With the increase of size, the dimension of the armature is too long, the magnetic field greatly attenuates along its path, and there will be large magnetic leakage in its bending area (clamping area), resulting in the rapid decreasing of driving performance.

b. Moving coil transducer: for example, a micro speaker, the moving coil transducer is suitable for products with large length and width sizes. The moving coil transducer uses the force of the energized coil in the static magnetic field as the main driving force, and uses the coil to drive the vibration suspension system to generate sound. The energized coil itself is not magnetically conductive and cannot effectively converge the magnetic field, and in its vibration gap, the magnetic leakage is high. At the same time, the magnetic conductive material will be used to connect the internal magnetic field and external magnetic field in a closed loop. However, the saturated magnetic flux density in the magnetic conductive material is high due to the limitation of thickness size, which also leads to high magnetic leakage and low energy conversion efficiency.

c. Vibration transducer (motor): the principle thereof is to apply the same frequency excitation at the resonant frequency of the vibration system, and cause the vibration system resonate strongly by using the feature of low damping of the system. There are many kinds of excitation methods, some of which are similar to that of the moving coil speaker, others are similar to that of the rotor motor, but the energy conversion efficiency is relatively low, resulting in a long start-stop time.

The transducers of the prior art are difficult to meet the higher performance requirements of electronic products. Therefore, it is necessary to further improve the transducers of the prior art and the electronic products thereof to solve the above problems.

SUMMARY

The technical problem to be solved by the present patent is to increase the driving force of the micro transducer by using the magnetic potential principle while keeping the existing micro transducer to be light and thin, so as to further improve the energy conversion efficiency; and to further reduce the resonant frequency of the product without changing the product size by using the inverse stiffness generated by the magnetic conductive material in the magnetic field, so as to further improve the low-frequency performance of the device, to meet the application requirements of electronic products for the transducers. The specific technical solution provided by the present invention is:

a magnetic potential transducer, comprising a fixed component and a movable component, wherein the fixed component comprises:

at least one static magnetic field generating device, wherein a static magnetic field is formed on the magnetic potential transducer by the static magnetic field generating device; and at least one alternating magnetic field generating device, wherein an alternating magnetic field is generated on the magnetic potential transducer by the alternating magnetic field generating device, and the alternating magnetic field is orthogonal or partially orthogonal to the static magnetic field, wherein the movable component comprises:

at least one movable device and at least one suspension device, wherein the movable device is provided with a magnetic conductive material, the magnetic conductive material moves integrally in the magnetic potential transducer, and at least a part of the magnetic conductive material is placed in an area where the alternating magnetic field and the static magnetic field overlap, to converge the static magnetic field and the alternating magnetic field, and a magnetic field force generated by an interaction between the static magnetic field and the alternating magnetic field acts on the magnetic conductive material, so as to drive the movable component to move.

As an improvement, a relative permeability of the magnetic conductive material of the movable device is greater than 3000, and a relative permeability of the suspension device is less than 1000.

As an improvement, the static magnetic field generating device is at least one permanent magnet, or at least one electromagnet in which an electric current is non-alternating, and the alternating magnetic field generating device is a coil to which alternating current is applied, a conductor to which vortex electric field is supplied, or a reversible permanent magnet.

As an improvement, the alternating magnetic field generating device is a coil provided along a horizontal direction, an electromagnet is formed by the coil and the magnetic conductive material of the movable device, and the alternating magnetic field is generated by the coil when alternating current passes through the coil, and is orthogonal or partially orthogonal to the static magnetic field.

As an improvement, the suspension device is further provided with an elastic restoring device, one end of the elastic restoring device is fixed on the movable device, the other end of the elastic restoring device is fixed inside the magnetic potential transducer, and the elastic restoring device has a restoring force for restoring the movable device to an equilibrium position.

As an improvement, the elastic restoring device of the suspension device comprises one or more of a diaphragm sheet, a spring and an elastic sheet.

As an improvement, the transducer is a magnetic potential speaker, the suspension device comprises a diaphragm, the magnetic conductive material is mounted on a surface of the diaphragm, the diaphragm isolates a front cavity and a rear cavity of the magnetic potential speaker, an edge of the diaphragm is fixed in the magnetic potential speaker, and the diaphragm forms a part of the elastic restoring device.

As an improvement, the magnetic conductive material has a planar sheet structure.

As an improvement, the magnetic conductive material is a soft magnetic material or a weakly hard magnetic material.

In the magnetic potential transducer with the new structure provided by the present invention, the magnetic conductive material is provided on the movable component, the static magnetic field and the alternating magnetic field are provided on the magnetic potential transducer, and the magnetic field force generated by the interaction of the static magnetic field and the alternating magnetic field acts on the magnetic conductive material, to drive the movable component to move. The law of the interaction of the static magnetic field and the alternating magnetic field conforms to the expression of the magnetic potential principle, i.e., the magnetomotive force balance principle: a total magnetic potential of the system remains unchanged in a certain range, and the magnetic field is distributed according to the principle of minimizing potential energy defined by current and magnetic flux. The magnetic potential transducer designed by using the magnetic potential principle can effectively improve the driving force while keeping the existing micro transducer to be light and thin.

The magnetic potential transducer with the new structure provided by the present invention makes full use of the inverse stiffness generated by the magnetic conductive material in the static magnetic field, i.e., the magnetic stiffness: the magnetic field force is proportional to the displacement of the movable component, and the direction of the magnetic field force is consistent with that of the displacement of the movable component, and the change rate of the magnetic field force with the change of the displacement is referred to as the magnetic stiffness. Without changing the product size, the inverse stiffness can effectively reduce the system stiffness, that is, it is superimposed with the stiffness provided by the elastic restoring device in the suspension system to form the system stiffness. The system stiffness and the system quality jointly determine the low-frequency resonant frequency of the system, so reducing the system stiffness through the inverse stiffness can further reduce the low-frequency resonant frequency of the system, so as to further increase the low-frequency performance of the device.

The present invention also provides an electronic apparatus, comprising the above magnetic potential transducer.

As an improvement, the electronic apparatus is a mobile phone, a tablet computer, a TV, an auto audio or a loudspeaker.

The electronic apparatus applying the magnetic potential transducer provided by the present invention meets the use requirements of the current electronic products for the transducer.

Other features and advantages of the present invention will become clear from the following detailed description of exemplary embodiments of the present invention with reference to the accompanying drawings.

BRIEF DESCRIPTION OF THE DRAWINGS

The accompanying drawings, which are incorporated in and constitute a part of the specification, illustrate embodiments of the present invention and are used to explain the principles of the present invention together with the description thereof.

DESCRIPTION OF THE REFERENCE NUMERALS

Figure 1:
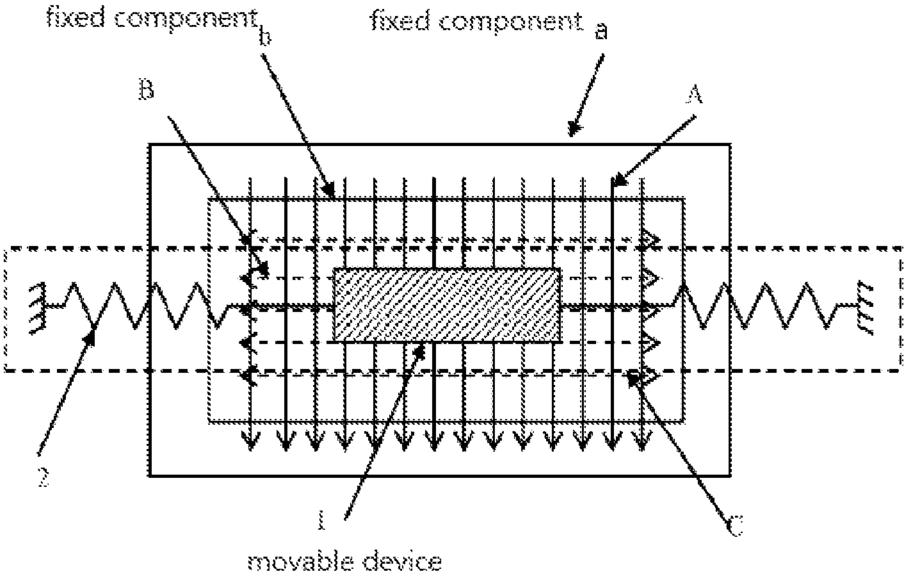
FIG. 1 is a schematic diagram of the overall structure of the magnetic potential transducer according to the embodiments of the present invention.

1: Magnetic conductive material; 11: first magnetic conductive material group; 12: second magnetic conductive material group; 2: suspension device; 21: diaphragm; 22: elastic sheet; 3: reinforcing portion; 4: coil; 41: first coil; 42: second coil; 5: permanent magnet; 51: first permanent magnet; 52: second permanent magnet; 6: sound outlet; 7: support member; 8: counterweight; A: Static magnetic field; a, a1, a2, a3, a4: static magnetic field generating device; B: alternating magnetic field; b, b1, b2, b3: alternating magnetic field generating device; C: movable component.

DETAILED DESCRIPTION OF EMBODIMENTS

Various exemplary embodiments of the present invention will now be described in detail with reference to the accompanying drawings. It should be noted that the relative arrangement, numerical expressions and numerical values of the parts and steps described in these embodiments do not limit the scope of the present invention unless otherwise specified.

The following description of at least one exemplary embodiment is only illustrative in fact and is in no way intended to limit the present invention and its application or use.

The technologies, methods and devices known to those skilled in the art may not be discussed in detail, but where appropriate, the technologies, methods and devices shall be regarded as a part of the specification.

In all of the examples shown and discussed here, any specific value should be interpreted as merely exemplary and not as a limitation. Therefore, other examples of exemplary embodiments may have different values.

It should be noted that similar reference numerals represent similar items in the following drawings. Therefore, once an item is defined in a drawing, it does not need to be further discussed in subsequent drawings.

According to one aspect of the present invention, the present invention provides a magnetic potential transducer, which comprises a fixed component and a movable component, wherein the fixed component comprises: at least one static magnetic field generating device, a static magnetic field is formed on the magnetic potential transducer by the static magnetic field generating device; and at least one alternating magnetic field generating device, an alternating magnetic field is generated on the magnetic potential transducer by the alternating magnetic field generating device, and is orthogonal or partially orthogonal to the static magnetic field, wherein the movable component comprises: at least one movable device and at least one suspension device, the movable device is provided with a magnetic conductive material, the magnetic conductive material moves integrally in the magnetic potential transducer, and at least a part of the magnetic conductive material is placed in an area where the alternating magnetic field and the static magnetic field overlap, to converge the static magnetic field and the alternating magnetic field, and a magnetic field force generated by an interaction between the static magnetic field and the alternating magnetic field acts on the magnetic conductive material to drive the movable component to move.

Hereinafter, the present invention is further described in combination with the accompanying drawings.

FIG. 1 shows a schematic diagram of the overall structure of the magnetic potential transducer according to the technical solution of the present invention. The magnetic potential transducer comprises a fixed component and a movable component C, wherein the fixed component specifically comprises a static magnetic field generating device a, which can generate a static magnetic field A in the magnetic potential transducer correspondingly, and an alternating magnetic field generating device b, which can generate an alternating magnetic field B, i.e., an alternating electromagnetic field in the magnetic potential transducer correspondingly, wherein the static magnetic field A and the alternating magnetic field B are orthogonal to each other. Of course, in some cases, the static magnetic field A and the alternating magnetic field B may not be completely orthogonal to each other, for example, the static magnetic field A and the alternating magnetic field B may be partially orthogonal to each other, which also does not affect the implementation of the technical solution.

The magnetic potential transducer of the present invention further comprises a movable component C suspended in the magnetic potential transducer through a suspension device 2, wherein the movable component C specifically comprises a movable device provided with a magnetic conductive material 1, and a suspension device 2 connected and fixed with at least a part of the movable device.

Specifically, in the structure shown in FIG. 1, the direction of the static magnetic field A thereof is provided in the vertical direction, and the direction of the alternating magnetic field B is provided in the horizontal direction, and the two directions are orthogonal. The magnetic conductive material 1 is provided in parallel to the direction of the alternating magnetic field B, that is, along the horizontal direction. When the alternating magnetic field generating device b is not energized, that is, when the alternating magnetic field has not been generated, in an ideal state, the magnetic conductive material 1 itself will be affected by the static magnetic force of the static magnetic field A, and the static magnetic force is equal in magnitude and opposite in direction on two sides of the magnetic conductive material 1. Therefore, the resultant force of the static magnetic force is 0 as a whole, and the magnetic conductive material can be maintained at the equilibrium position. In other cases, the resultant force of the static magnetic force applied on the magnetic conductive material 1 by the static magnetic field $A \neq 0$, and the magnetic conductive material 1 itself has a trend of deviating from the equilibrium position. However, due to the existence of the suspension device 2, an elastic restoring force may be provided to maintain the magnetic conductive material 1 at the original equilibrium position.

When the alternating magnetic field B is generated, the magnetic conductive material 1 itself is located in the area where the static magnetic field A and the alternating magnetic field B overlap, the magnetic conductive material 1 converges the magnetic field located in the area, an interactive force is definitely generated between the alternating magnetic field B and the static magnetic field A, and the interactive force acts on the magnetic conductive material 1 to drive the movable component C to move. In the process of this reciprocating motion, since the movable device is connected with the suspension device 2, the suspension device 2 can provide an elastic restoring force to the movable device, that is, if the movable component C moves downward, the suspension device 2 may provide an upward pulling force, and if the movable component C moves upward, the suspension device 2 may provide a downward pulling force, that is, the magnetic conductive material 1 moves integrally under the overall force of the static magnetic field A, the alternating magnetic field B and the suspension device 2.

It should be noted that the expression that the magnetic conductive material 1 moves integrally in the magnetic potential transducer in the present invention means that the magnetic conductive material 1 is freely provided on the suspension device 2, and the boundary thereof is not clamped on other components, which is essentially different from the U-shaped or T-shaped armature structure of the moving iron transducer described above. In such design of the present invention, since the magnetic conductive material is small, the magnetic potential transducer does not have the problems that the dimension of the armature is too long, the magnetic field attenuates greatly along its path, and a large magnetic leakage occurs in its bending area (clamping area), which generally exist in the moving iron transducer. In the present invention, the magnetic conductive material 1 drives the movable component to vibrate through the interaction of the static magnetic field A and the alternating magnetic field B. According to the magnetomotive force balance principle (i.e., the total magnetic potential of the system remains unchanged in a certain range), the magnetic field is distributed according to the principle of minimizing potential energy defined by current and magnetic flux. The driving force is effectively increased by using the magnetic potential principle while keeping the existing micro transducer to be light and thin.

In addition, the structural design of the present invention begins with magnetic potential transducers having various structures, which comprise speakers, motors, multifunctional products integrating vibration and sound generation, and other products in the field of consumer electronics, also comprise automotive electronics, intelligent audios and other products applied in the field of non-consumer electronics, for example, motors, loudspeakers, etc. which may output sound radiation and realize certain displacement or vibration energy.

The above is the description of the structural configuration and basic working principle of the magnetic potential transducer of the present invention. During the specific implementation, each portion constituting the magnetic potential transducer may flexibly select different composition forms according to the actual needs.

Figure 2:
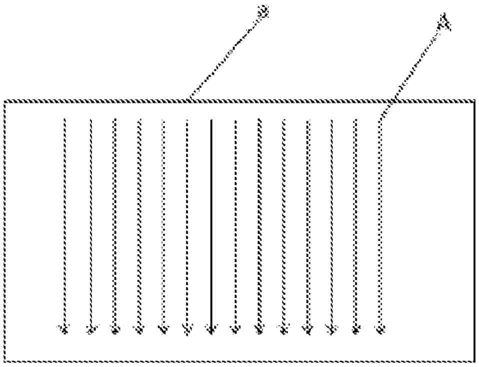
FIG. 2 is a schematic diagram of the magnetic induction line of the static magnetic field of the magnetic potential transducer according to the embodiments of the present invention.
Figure 3:
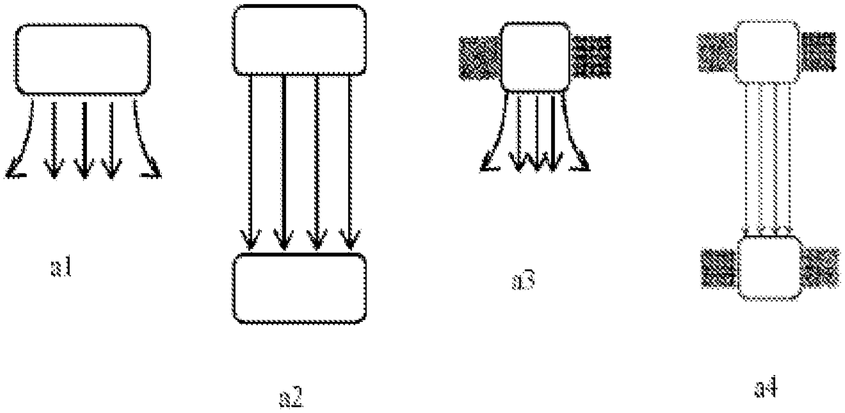
FIG. 3 is a schematic diagram of optional structures of the static magnetic field generating device corresponding to the static magnetic field in FIG. 2.

Taking FIG. 2 as an example, when the direction in the static magnetic field A generated by the static magnetic field generating device a is as shown in FIG. 2, FIG. 3 shows a variety of different static magnetic field generating devices corresponding to FIG. 2. In FIG. 3, a1 is one permanent magnet and a2 is two opposite disposed permanent magnets, it is easy to understand that, at this time, the magnetic poles at the corresponding ends of the two permanent magnets are opposite to each other, and the magnetic pole at the corresponding end of the permanent magnet at the upper side is N pole, and the magnetic pole at the corresponding end of the permanent magnet at the lower side is S pole; the static magnetic field generating device a may also be the electromagnet structure shown in a3, i.e., coil+core (magnetic conductive member), and a3 should select an electromagnet structure in which current is non-alternating because it needs to generate a stable static magnetic field A; similarly, the static magnetic field generating device a may also employ the structure of a pair of electromagnets shown in a4. That is, for the device generating static magnetic field A, it may preferably have a structure of at least one permanent magnet and at least one electromagnet in which current is non-alternating, or even may be a combination of permanent magnet and electromagnet, which is not limited by the structure shown above.

Figure 4:
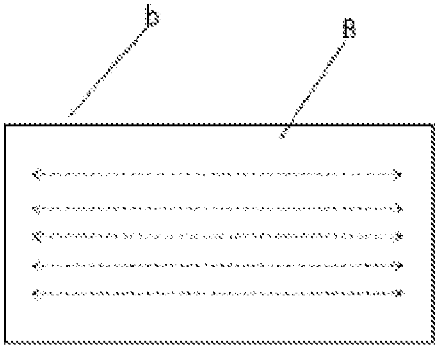
FIG. 4 is a schematic diagram of the magnetic induction line of the alternating magnetic field of the magnetic potential transducer according to the embodiments of the present invention.
Figure 5:
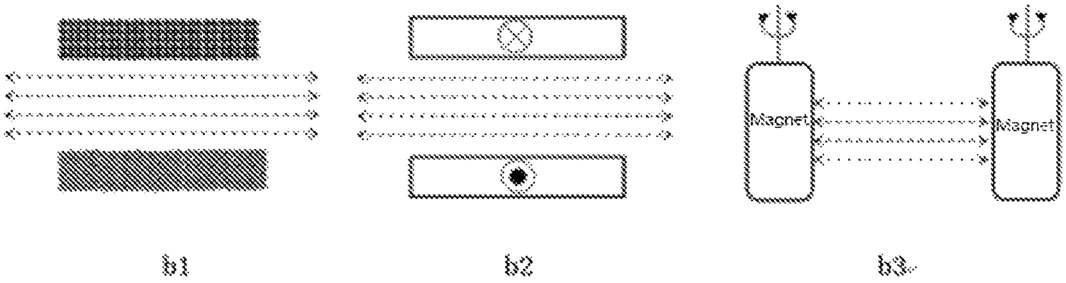
FIG. 5 is a schematic diagram of optional structures of the alternating magnetic field generating device corresponding to the alternating magnetic field in FIG. 4.

Referring to FIG. 4, when the direction of the magnetic induction line of the alternating magnetic field B generated by the alternating magnetic field generating device b is as shown in FIG. 4, FIG. 5 shows a structures of the optional partial alternating magnetic field generating device corresponding to FIG. 4, for example, it may be a coil applied with alternating current shown in b1, a conductor applied with vortex electric field shown in b2, or a reversible permanent magnet shown in b3. Each of the above structures may generate the alternating magnetic field B, of course, the alternating magnetic field generating device is not limited to the above three structures, and may also be other generating devices.

Preferably, the alternating magnetic field generating device b is a coil provided along the horizontal direction, an electromagnet is formed by the coil and the magnetic conductive material 1, the magnetic conductive material 1 is polarized when the coil is supplied with alternating current, and the static magnetic field A is orthogonal to the alternating magnetic field, so that the magnetic conductive material 1 may be driven to perform reciprocating motion under the action of the magnetic field.

It should be noted that FIG. 1 only shows a schematic diagram of a structure of the present invention and does not represent all the implementation forms that can be covered by the present invention, and the directions of static magnetic field A and alternating magnetic field B are only illustrative as a possible design. It is easy for those skilled in the art to understand that when the direction of magnetic field changes, the static magnetic field generating device a and the alternating magnetic field generating device b will also be adjusted correspondingly to meet the requirements of its magnetic field design.

Figure 6A:
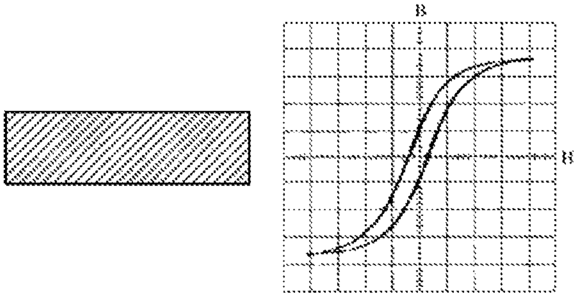
FIG. 6A is a schematic diagram of an optional structure of the magnetic conductive material in the magnetic potential transducer according to the embodiments of the present invention.
Figure 6B:
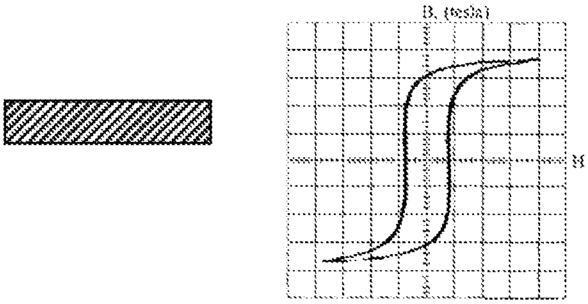
FIG. 6B is a schematic diagram of another optional structure of the magnetic conductive material in the magnetic potential transducer according to the embodiments of the present invention.

Referring to FIG. 6A, it shows a magnetic conductive material of the magnetic potential transducer of the present invention and its corresponding H-B curve; according to the H-B curve, the magnetic conductive material selected at this time is a soft magnetic material. Similarly, referring to FIG. 6B, it shows another magnetic conductive material of the magnetic potential transducer of the present invention and its corresponding H-B curve; according to the H-B curve, the magnetic conductive material selected at this time is a weakly hard magnetic material.

Preferably, the relative permeability of the magnetic conductive material in the movable device is greater than 3000, while the relative permeability of the suspension device 2 is less than 1000. This is because: in order to effectively improve the driving force, the magnetic conductive material 1 in the movable device is preferably a high permeability magnetic conductive material, while the relative permeability of the high permeability magnetic conductive material is generally greater than 3000, and the suspension device 2 is preferably a weak magnetic conductive material/non-magnetic conductive material. In this case, the suspension device 2 has less interference or influence on the movable device. The materials shown above are only more preferred materials, and in fact, other kinds of magnetic conductive materials may also be selected.

For the suspension device 2, one of the main functions of the suspension device 2 is to provide an elastic restoring force for the movement of the movable component C. Based on the function to be achieved by the suspension device 2, one end thereof needs to be fixed on the movable component C, and the other end needs to be fixed on the magnetic potential transducer. When the movable component C performs reciprocating motion, the suspension device 2 may provide a force for pulling the movable component C to the equilibrium position. During specific implementation, the suspension device may comprise one or more of a diaphragm sheet, a spring, an elastic sheet, etc.

Compared with several conventional transducers in the prior art, the magnetic potential transducer provided by the present invention has obvious advantages. The details are as follows.

1) Compared with the moving iron transducer (speaker), the present invention mainly uses the central magnetic conductive material to drive the movable component to generate sound or vibrate, and the magnetic conductive material moves integrally. It is applicable to products with large length and width, and can maintain high driving performance, and is facilitate to the combination with mechanical suspension system.
2) Compared with the moving coil transducer (speaker), the present invention mainly uses the magnetic potential principle to generate the driving force by the interaction of the static magnetic field and the alternating magnetic field which are orthogonal or partially orthogonal to each other, and the energy conversion efficiency is significantly higher than that of the moving coil transducer.

3) Compared with the vibration transducer (motor), the present invention may cause the system generate strong resonance by using the resonance principle, and may effectively shorten the start-stop time due to its high energy conversion efficiency.

The magnetic potential transducer of the present invention is briefly described above from the basic structure configuration, working principle and deformable structure of each module, and is further described below in combination with three specific embodiments.

Embodiment 1

Figure 7:
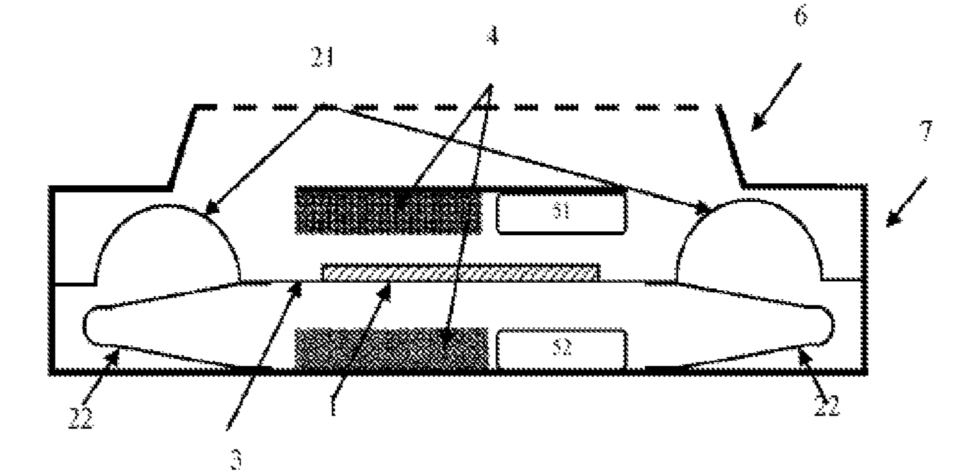
FIG. 7 is a schematic diagram of the overall structure of the magnetic potential speaker according to the embodiment 1 of the present invention.

Referring to FIG. 7, a structure of a magnetic potential speaker according to the invention concept of the present invention is shown. In this embodiment, the fixed component of the magnetic potential speaker comprises a static magnetic field generating device and an alternating magnetic field generating device, wherein the static magnetic field generating device comprises two permanent magnets (the first permanent magnet 51 and the second permanent magnet 52), and the alternating magnetic field generating device is a coil 4 fixed on the magnetic potential speaker and provided in the horizontal direction. The movable component C of the speaker comprises a movable device, the movable device is provided with a magnetic conductive material 1 thereon, and the magnetic conductive material 1 has a magnetic congregate effect. The movable component C further comprises a suspension device 2. The suspension device 2 is provided with an elastic restoring device thereon, specifically, comprises a diaphragm 21 and an elastic sheet 22, wherein the diaphragm 21, specifically the edge portion of the diaphragm 21 provides an elastic restoring force, therefore, the diaphragm 21 constitutes a part of the elastic restoring device.

Specifically, as shown in the accompanying drawings, when the alternating current signal passes through the coil 4, the magnetic conductive material 1 located in the coil may be polarized under the action of the alternating magnetic field, that is, one end thereof is N pole and the other end thereof is S pole; and the two permanent magnets 5 arranged in parallel with it may also be configured with opposite magnetic poles at two opposite ends, that is, one end of the two opposite ends is N pole and the other end of the two opposite ends is S pole, and one end of the magnetic conductive material 1 is located in the static magnetic field generated by the permanent magnets 5 at the same time, in this way, the magnetic conductive material 1 performs reciprocating motion under the combined action of the permanent magnets 5 and the alternating magnetic field.

On the other hand, the magnetic conductive material 1 is directly connected and fixed with the diaphragm 21. It is easy to understand that, when the magnetic conductive material 1 performs reciprocating motion, it may naturally drive the flexible diaphragm 21 to perform reciprocating motion, and the sound wave generated by the vibration of the diaphragm 21 may be radiated to the outside through the sound outlet 6. The diaphragm 21 may also function to isolate the front cavity and rear cavity of the speaker.

In addition, as mentioned above, in the movable component C, the suspension device 2 further comprises an elastic sheet 22. One end of the elastic sheet 22 is connected and fixed on the diaphragm 21 and the other end of the elastic sheet 22 is fixed on the support member 7, this configuration can provide an elastic restoring force for the reciprocating motion of the movable component, so as to cause the movable component return to the equilibrium position.

Specifically, in this embodiment, the elastic sheet 22 operates as an inverse stiffness balancing device, the inverse stiffness means the magnetic stiffness, that is, when the magnetic conductive material (comprising soft magnetic material and hard magnetic material) is close to the area with high magnetic flux density, the force on the magnetic conductive material gradually increases and the direction of the force is consistent with the moving direction of the magnetic conductive material. The change rate of the force to the displacement of the magnetic conductive material is referred to as the inverse stiffness of the magnetic conductive material. The following factors may be taken into account in the specific design.

1) The inverse stiffness in the micro transducer is measured by simulation or test, if there is nonlinearity, the curve that the static magnetic force applied on the movable device changes as the displacement of the movable device changes must be obtained by simulation or test.
2) According to the design requirement for the first-order resonant frequency and the measurement result of the inverse stiffness, the stiffness requirement for the force balancing device is obtained. According to this requirement and in combination with the internal spatial structure of the micro transducer, at least one inverse stiffness balancing device is designed, and the structure thereof may take many forms, for example, the above-mentioned elastic sheet 22, spring, magnetic spring, etc.

In addition to the above factors, the design of the inverse stiffness balancing device shall follow its own design criteria: for example, the elastic sheet or spring structure must meet the requirement that the stress generated when this member is stretched or compressed to the limit displacement is less than the yield strength of this member; and the magnetic spring structure must meet the requirement that it does not exceed the action scope of its magnetic field force when it is stretched or compressed to the limit displacement.

It can be seen that in this embodiment, in addition to the diaphragm 21 being capable of also function to achieve the elastic recovery, the inverse stiffness is balanced by additionally adding an inverse stiffness balancing device. This design may bring the following advantages.

a) If the stiffness balance and the inverse stiffness balance of the force balancing device are designed respectively, the driving force may be designed respectively regardless of the inverse stiffness; compared with the moving coil speaker, the magnetic potential transducer of the present invention not only has high conversion efficiency, but also may use the inverse stiffness to efficiently reduce the first-order resonant frequency of the system and increase the low-frequency performance of the system.
b) The stiffness of the force balancing device is only affected by its own structure, so that the total stiffness of the system may be adjusted by adjusting the stiffness of the force balancing device, so as to indirectly adjust the first-order resonant frequency of the system.

Embodiment 2

Figure 8:
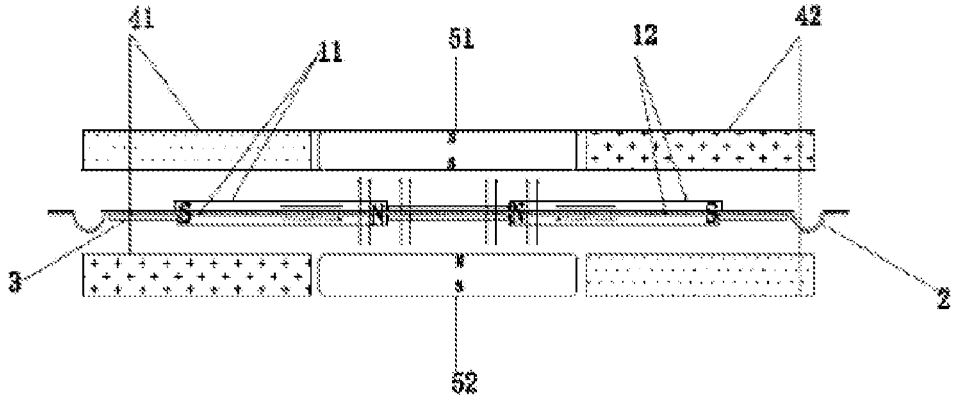
FIG. 8 is a schematic diagram of the structure of the fixed component and the movable component of the magnetic potential speaker according to the embodiment 2 of the present invention.

As shown in FIG. 8, the embodiment 2 also shows a magnetic potential speaker according to the invention concept of the present invention, and differs from the embodiment 1 in that the magnetic potential speaker comprises two groups of magnetic conductive materials 1, and each of the two groups of magnetic conductive materials comprises two sheet-like magnetic conductive materials respectively, which are marked as a first magnetic conductive material group 11 and a second magnetic conductive material group 12.

Specifically, in this embodiment, there are two coils 4, i.e., a first coil 41 and a second coil 42. Two permanent magnets 5 (i.e., a first permanent magnet 51 and a second permanent magnet 52) are provided correspondingly, and the first permanent magnet 51 and the second permanent magnet 52 are opposite and provided at two sides of the magnetic conductive material 1, that is, the first permanent magnet 51 may be provided at the upper side of the magnetic conductive material 1, while the second permanent magnet 52 is provided at the lower side of the magnetic conductive material 1 correspondingly.

Wherein the alternating magnetic field B is the alternating magnetic field formed by the coil 4 when alternating current passes through the coil 4, and the direction of the alternating magnetic field B is provided in the horizontal direction. The alternating magnetic field A is the static magnetic field formed by the permanent magnets 5, and the direction of the static magnetic field is provided in the vertical direction.

In order to enable the magnetic conductive material 1 to be used as a driving source to drive the vibration device to vibrate, in this embodiment, from the distribution of each component, the end of the first magnetic conductive material group 11 is located in the alternating magnetic field B generated by the first coil 41, and at least a part of the first magnetic conductive material group 11 is located in the static magnetic field A generated by the first permanent magnet 51 and the second permanent magnet 52 at the same time, specifically, located in the area where the static magnetic field A and the alternating magnetic field B overlap with each other, and the magnetic conductive material 1 converges magnetism in the area. Similarly, the end of the second magnetic conductive material group 12 is located in the alternating magnetic field B generated by the second coil 42, and at least a part of the second magnetic conductive material group 12 is located in the static magnetic field A generated by the first permanent magnet 51 and the second permanent magnet 52 at the same time.

The magnetic poles at the opposite ends of the first permanent magnet 51 and the second permanent magnet 52 are opposite. In this embodiment, it may be assumed that the magnetic poles at the opposite ends of the first permanent magnet 51 and the second permanent magnet 52 are S pole and N pole respectively, and the magnetic poles at two ends far away from each other are N pole and S pole respectively. Similarly, alternating current signals in opposite directions are applied to the first coil 41 and the second coil 42, wherein "⊕" indicates that the current direction is perpendicular to and directed to the inside of the paper, and "⊙" indicates that the current direction is perpendicular to the paper and directed to the outside of the paper. The first magnetic conductive material group 11 is polarized in the alternating magnetic field generated by the first coil 41, and the second magnetic conductive material group 12 is polarized in the alternating magnetic field B generated by the second coil 42. It can be determined according to the right-hand rule that, the adjacent ends of the first magnetic conductive material group 11 and the second magnetic conductive material group 12 are N poles, and the ends of the first magnetic conductive material group 11 and the magnetic conductive material group 12 far away from each other are S poles. The arrows in FIG. 6 show the direction of the magnetic induction line inside the magnetic conductive material 1 after polarization and the direction of the magnetic induction line of the static magnetic field A, respectively. Taking the first magnetic conductive material group 11 as an example, one end thereof is N pole, one end of the first permanent magnet 51 is S pole and close to the N pole of the first magnetic conductive material group 11, and one end of the second permanent magnet 52 is N pole and close to the N pole of the first magnetic conductive material group. Therefore, the first magnetic conductive material group 11 is subject to the attraction force and the repulsion force of the static magnetic field between the first permanent magnet 51 and the second permanent magnet 52 respectively, and the two forces are in the same direction. Similarly, the second magnetic conductive material group 12 is also subject to the same attraction force and repulsion force of the static magnetic field between the first permanent magnet 51 and the second permanent magnet 52, and in combination with the action of the suspension device 2, the magnetic conductive material 1 may perform reciprocating motion under the interaction of the static magnetic field A and the alternating magnetic field B.

That is, in such movable component C, the magnetic conductive material 1 participates in vibration as a whole based on its own magnetic congregate effect and the interaction force of two corresponding external magnetic fields, so that the magnetic conductive material 1 may be regarded as a part of the movable device.

Of course, this embodiment shows only one possible implementation, and the magnetic induction line directions of the static magnetic field A and the alternating magnetic field B are not limited to the directions shown in the accompanying drawings. For example, the magnetic poles at the opposite ends of the first permanent magnet 51 and the second permanent magnet 52 may be provided opposite to those shown in the accompanying drawings. In addition, the current supplying directions of the first coil 41 and the second coil 42 may also be opposite to those shown in the accompanying drawings. Correspondingly, the polarities of the adjacent ends and the ends far away from each other of the magnetic conductive materials 1 after polarization will also be opposite, and in combination with the action of the suspension device 2, it may perform reciprocating motion under the action of the alternating magnetic field and the static magnetic field.

It should be noted that, in addition to the above reciprocating motion of the suspension device 2 driven by the magnetic conductive material 1, since the suspension device 2 itself is a material having elastic, therefore in the process of the reciprocating motion, its edge portion itself also constitutes a part of the elastic restoring device. When the magnetic conductive material 1 vibrates, the suspension device 2 may provide an elastic restoring force for restoring the movable component. The suspension device 2 herein is actually a diaphragm sheet, and the diaphragm sheet itself participates in the movement as a part of the movable device, in addition, as described above, its edge portion also operated as an elastic restoring device mechanism, therefore it functions the effect of the suspension device.

In addition, it is preferred that when the suspension device 2 vibrates, in order to improve the phenomenon of split vibration, a reinforcing portion 3 may be provided on the surface of the suspension device 2, and the reinforcing portion 3 is generally a material part with high rigidity.

In a specific implementation, the specific structure of the support member 7 is not limited, it may be an integrally formed annular housing with an opening, or a housing assembly formed by connecting and fixing a plurality of independent housing components together.

The applicant further describes the transducer according to the embodiments of the present invention from the perspective of transducer assembly. As shown in FIG. 7 and FIG. 8 together, the support member 7 provides a peripheral frame, in which the permanent magnets 5, the first coil 41 and the second coil 42 may be positioned in the frame provided by the support member 7. Specifically, the first coil 41, the permanent magnets 5 and the second coil 42 are assembled from left to right in the horizontal direction, that is, the first coil 41 and the second coil 42 are fixed at two sides of the permanent magnets 5 respectively, and maintain a certain gap with the permanent magnets 5. After the two permanent magnets are mounted correspondingly, a vibration space is formed in the vibration direction of the transducer. In the vibration space, the suspension device 2 and the magnetic conductive material 1 driving the suspension device 2 to vibrate are mounted, wherein the magnetic conductive material 1 is connected to and fixed on the surface of the suspension device 2, and there is a certain distance between the magnetic conductive material 1 and the second ends of the first permanent magnet 51 and the second permanent magnet 52. In this way, it may ensure that it has a space for the reciprocating motion under the action of the static magnetic field A and the alternating magnetic field B. The first fixing portion of the inverse stiffness balancing device is assembled on the wall of the support member 7, and the second fixing portion is connected to the movable component to provide an additional independent elastic restoring force.

Embodiment 3

Figure 9:
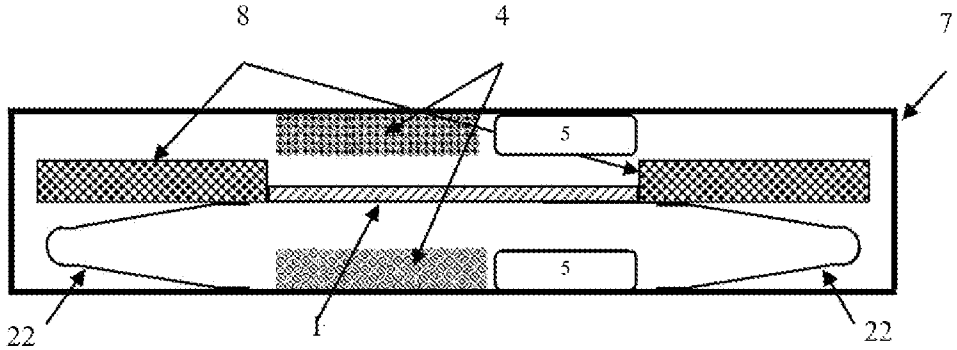
FIG. 9 is a schematic diagram of the overall structure of the magnetic potential vibration transducer according to the embodiment 3 of the present invention.

As shown in FIG. 9, a magnetic potential vibration transducer according to the invention concept of the present invention is shown, and this embodiment differs from the embodiment 1 and the embodiment 2 in that:

As a motor structure, the movable component C is composed of a magnetic conductive material 1, a counterweight 8 and an elastic sheet 22. The elastic sheet 22 constitutes a suspension device. The driving principle thereof is the same as the above two embodiments and will not be repeated here. It should be noted that in this embodiment, the magnetic conductive material 1 drives the counterweight 8 to perform reciprocating vibration, and the elastic sheet 22 provides an elastic restoring force for the vibration. In the magnetic potential transducer in the form of motor applied by the present invention, the movable component C composed of the magnetic conductive material 1, the counterweight 8 and the elastic sheet 22 forms the vibration portion of the motor, which will cause the motor to generate strong resonance, and the start-stop time is effectively shortened due to its high energy conversion efficiency. At the same time, the inverse stiffness is used to effectively reduce the resonant frequency, so that the system may obtain full low-frequency vibration without using a large mass, and increase the comfort of vibration feeling.

In the present invention, it should be noted that: first, the magnetic conductive material 1 may have a planar sheet structure, and may be provided in one piece or two pieces, or in a combined form, and the number of magnetizers that may be provided for each group of magnetic conductive materials is not limited, moreover, the composition of the magnetic conductive material does not necessarily have to be formed by an independent magnetizer, for example, when the magnetic conductive material is connected to the diaphragm, it may also be composed of a magnetic conductive material covering a part of the surface of the diaphragm by coating or other methods; second, in order to make the movable device to vibrate in a more balanced manner, the magnetic conductive material is preferably symmetrically distributed on the surface of the diaphragm, of course, when it is provided in a plurality of groups, it may also adopt the mode of staggered distribution, etc.; third, in the specific implementation of the present invention, it may be applied not only to square transducers, but also to circular transducers or transducers with other shapes, correspondingly, the diaphragm may be provided to have a square or circular shape, etc.; fourth, the number of the static magnetic field generating devices, the alternating magnetic field generating devices, the movable devices and the suspension devices in the magnetic potential transducer may be one or more.

According to another aspect of the present invention, the present invention also provides an electronic apparatus comprising the above magnetic potential transducer, and the electronic apparatus has high energy conversion efficiency and good low-frequency performance.

The magnetic potential transducer of the present invention has excellent adaptability to products of different sizes, so its application scene is also wider, specifically, it may be applied to an electronic apparatus such as a mobile phone, a tablet computer, a TV, an auto audio or a loudspeaker.

Although some specific embodiments of the present invention have been described in detail by examples, those skilled in the art should understand that the above examples are only for illustration and not to limit the scope of the present invention. Those skilled in the art should understand that the above embodiments may be modified without departing from the scope and spirit of the present invention. The scope of the present invention is defined by the appended claims.

What is claimed is:

1. A magnetic potential transducer, comprising a fixed component and a movable component, wherein the fixed component comprises:

at least one static magnetic field generating device, a static magnetic field is formed on the magnetic potential transducer by the static magnetic field generating device; and at least one alternating magnetic field generating device, an alternating magnetic field is generated on the magnetic potential transducer by the alternating magnetic field generating device, and the alternating magnetic field is orthogonal or partially orthogonal to the static magnetic field, wherein the movable component comprises at least one movable device and at least one suspension device, and wherein the movable device is provided with a magnetic conductive material, the magnetic conductive material moves integrally in the magnetic potential transducer, and at least a part of the magnetic conductive material is disposed in an area where the alternating magnetic field and the static magnetic field are overlapped, such that the static magnetic field and the alternating magnetic field are converged, and wherein a magnetic field force generated by an interaction between the static magnetic field and the alternating magnetic field are applied on the magnetic conductive material, so as to drive the movable component to move, wherein a relative permeability of the magnetic conductive material of the movable device is greater than 3000, and a relative permeability of the suspension device is less than 1000.

2. The magnetic potential transducer according to claim 1, wherein the static magnetic field generating device is at least one permanent magnet or at least one electromagnet in which an electric current is non-alternating, and wherein the alternating magnetic field generating device is a coil through which an alternating current passes, a conductor to which a vortex electric field is applied, or a reversible permanent magnet.

3. The magnetic potential transducer according to claim 2, wherein the alternating magnetic field generating device is a coil provided along a horizontal direction, an electromagnet is formed by the coil and the magnetic conductive material of the movable device, the alternating magnetic field is generated by the coil when the alternating current passes through the coil, and the alternating magnetic field is orthogonal or partially orthogonal to the static magnetic field.

4. The magnetic potential transducer according to claim 3, wherein the magnetic conductive material has a planar sheet structure.

5. The magnetic potential transducer according to claim 1, wherein the suspension device is further provided with an elastic restoring device, one end of the elastic restoring device is fixed on the movable device, the other end of the elastic restoring device is fixed in the magnetic potential transducer, and the elastic restoring device has a restoring force for restoring the movable device to a balance position.

6. The magnetic potential transducer according to claim 5, wherein the elastic restoring device of the suspension device is one or more of a diaphragm sheet, a spring and an elastic sheet.

7. The magnetic potential transducer according to claim 5, wherein the transducer is a magnetic potential speaker, the suspension device comprises a diaphragm, the magnetic conductive material is mounted on a surface of the diaphragm, the diaphragm isolates a front cavity and a rear cavity of the magnetic potential speaker, an edge of the diaphragm is fixed in the magnetic potential speaker, and the diaphragm forms a part of the elastic restoring device.

8. The magnetic potential transducer according to claim 1, wherein the magnetic conductive material is a soft magnetic material or a weakly hard magnetic material.

9. An electronic apparatus, comprising the magnetic potential transducer according to claim 1.

10. The electronic apparatus according to claim 9, wherein the electronic apparatus is a mobile phone, a tablet computer, a TV, an auto audio or a loudspeaker.

* * * * *